June 16, 1931.　　　S. S. SPIRE　　　1,810,889
AGRICULTURAL IMPLEMENT
Filed March 31, 1930　　　2 Sheets-Sheet 1
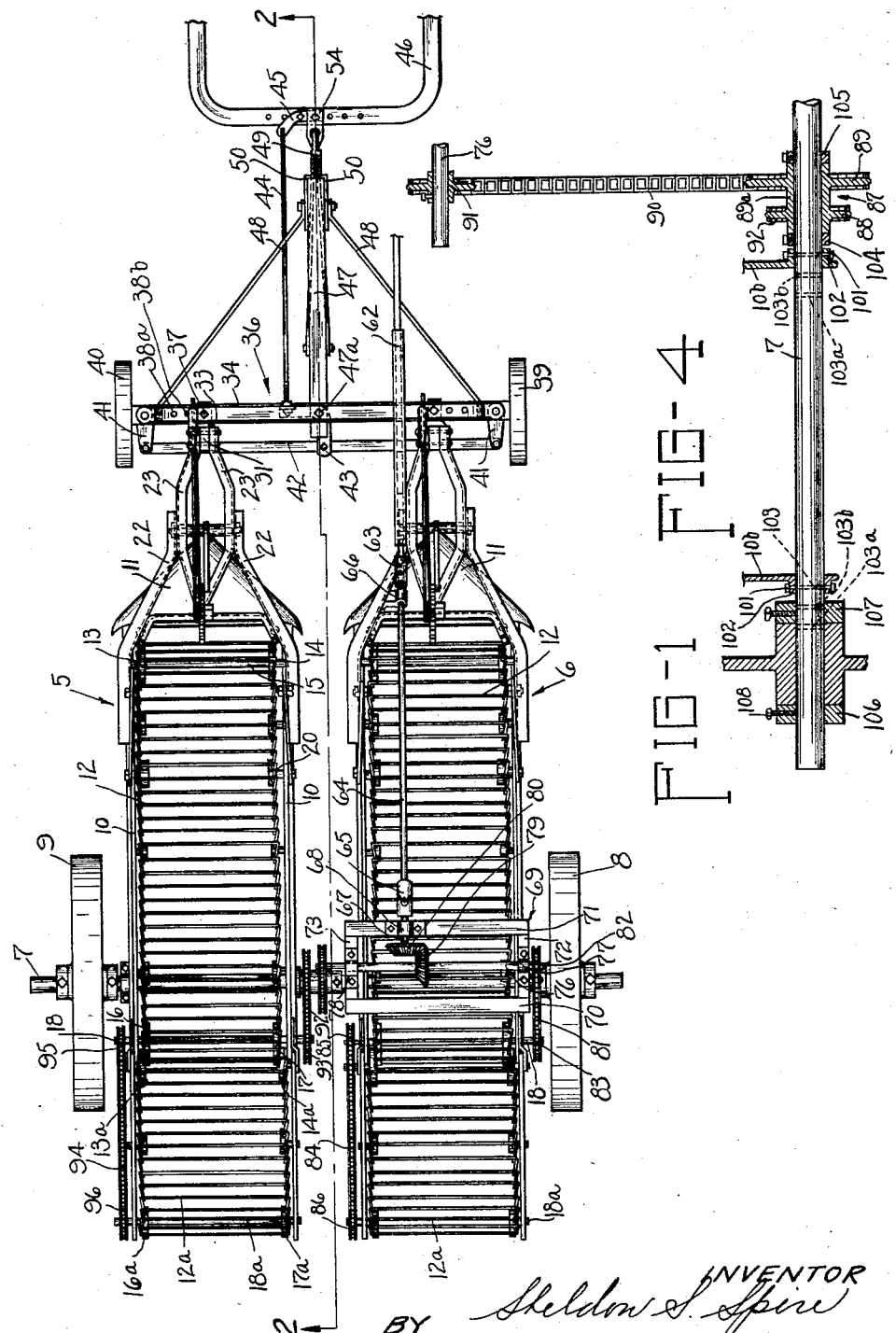

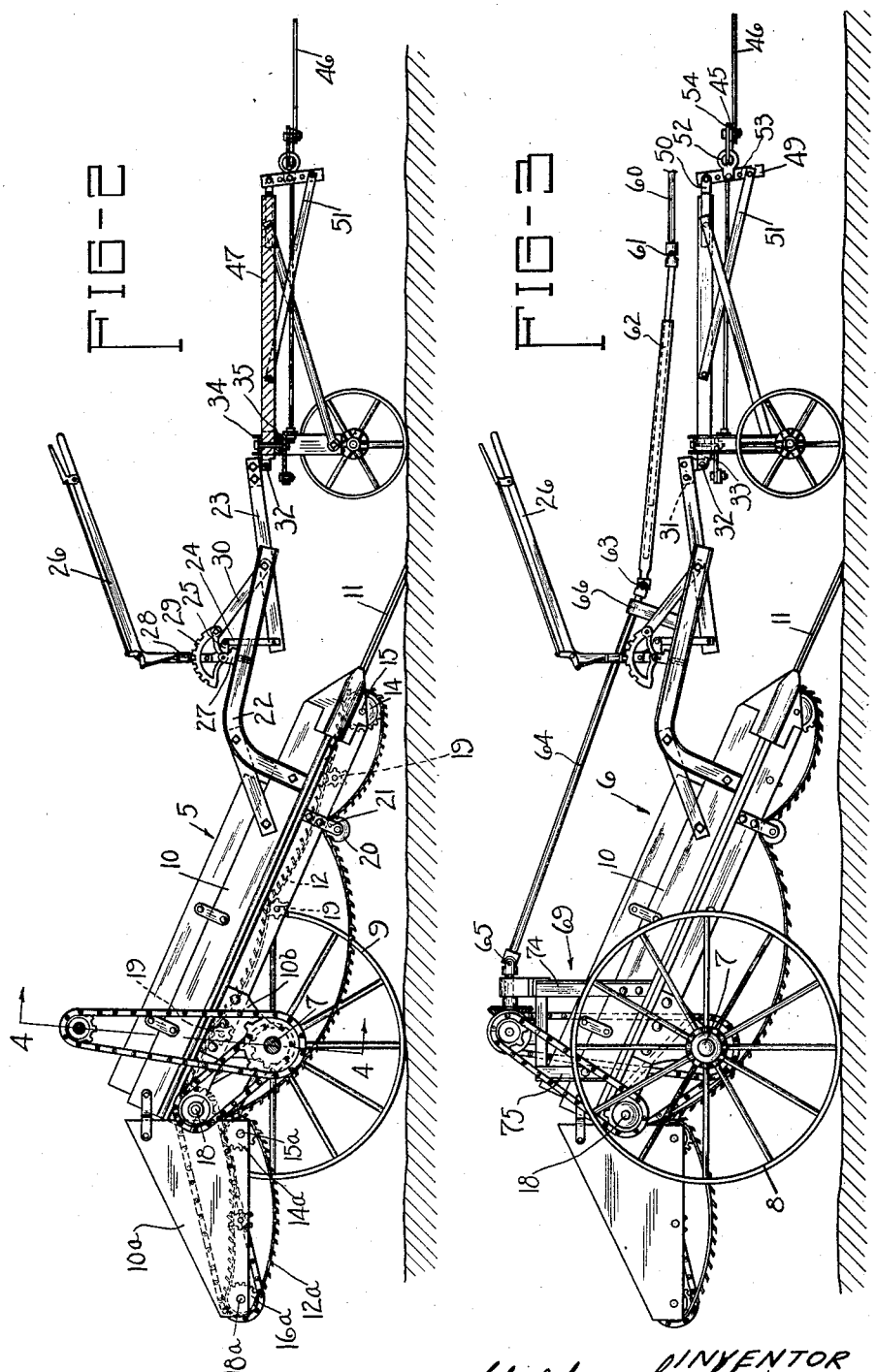

Patented June 16, 1931

1,810,889

UNITED STATES PATENT OFFICE

SHELDON S. SPIRE, OF SYRACUSE, NEW YORK, ASSIGNOR TO SYRACUSE CHILLED PLOW COMPANY, INC., OF SYRACUSE, NEW YORK, A CORPORATION OF NEW YORK

AGRICULTURAL IMPLEMENT

Application filed March 31, 1930. Serial No. 440,314.

This invention relates to multi-row agricultural implements in general, but has to do more particularly with such implements as potato diggers adapted to be drawn and operated by a tractor.

The object of my invention consists in the provision of a two-row potato digger in which one of the potato digging units is driven by a direct connection with the tractor, and the second digging unit is driven from the first, the driving connection between the two being such that the second digging unit may be raised or lowered with respect to the first without affecting the driving connection.

While I have illustrated my invention in connection with a two-row potato digger, the invention broadly is applicable to other types of multi-row implements. I, therefore, do not wish to be limited to its application to a two-row potato digger.

In order to acquaint those skilled in the art with the manner of using my invention, I have disclosed one embodiment thereof in the following specification and accompanying drawings, in which Figure 1 is a top view of a two-row potato digger adapted to be drawn by a tractor and embodying my invention;

Figure 2 is a cross-sectional view taken along the line 2—2 of Figure 1;

Figure 3 is a side elevational view of the digger shown in Fig. 1; and,

Figure 4 is a cross-sectional view taken along the line 4—4 of Figure 2.

The digger comprises two digging units 5 and 6 mounted on a transverse axle 7 on the ends of which wheels 8 and 9 are journaled. Each digging unit comprises a downwardly and forwardly inclined frame structure 10 pivotally supported on axle 7 by means of brackets 10b. A digging tool 11 is rigidly connected to the forward end of frame 10. A slatted endless conveyor 12 extends upwardly and rearwardly from the rear end of the tool 11 between the sides of the frame 10, being supported at its front end on sprockets or rollers 13 and 14 mounted on shaft 15, and at its rear end on sprockets 16 and 17 fixedly mounted on shaft 18. The upper side of the conveyor is also supported by auxiliary sprockets or rollers 19 journaled from the sides of frame 10. The return side of the conveyor is held up off the ground by rollers 20 supported in brackets 21 depending from the sides of frame 10.

At the rear of each conveyor 12 a second horizontal conveyor 12a is positioned. This conveyor is supported at its front end on sprockets or rollers 13a and 14a mounted on shaft 15a, and at its rear end is supported on sprockets 16a and 17a fixedly mounted on shaft 18a. Shafts 15a and 18a are journaled in side boards 10a suitably supported from the sides of the frame structure 10.

The front end of the frame 10 is supported by two beams 22 which rise up from opposite sides of the frame and extend forwardly, being pivotally connected at their forward end to two supporting members 23. The rear ends of members 23 converge rearwardly, and at their point of convergence are connected by means of the link 24 to a forwardly extending arm 25 of a raising and lowering lever 26. Lever 26 is pivotally supported on a transverse member 27 which is connected at its ends to beams 22. Lever 26 is provided with a latch 28 which cooperates with the sector 29 to hold the digging unit in any selected position of vertical adjustment. The sector 29 is mounted on member 27 and is held against rotation relative to beams 22 by means of the brace 30.

The forward ends of members 23 are bolted together to a block 31 which is pivotally connected at 32 to a companion block 33. The block 33 is mounted between members 34 and 35 comprising the frame of tongue truck 36 by means of a bolt 37 passing through aligned perforations 38 in members 34 and 35 and block 33. Other perforations 38a and 38b are provided in members 34 and 35 for making adjustments for different row spacings.

The truck 36 is supported on two dirigible wheels 39 and 40 suitably mounted on spindles journaled in vertical sleeves carried at each end of members 34 and 35. The wheel spindles are provided with rearwardly extending arms 41 connected together by means of a drag link 42. A bell crank 43 is journaled on the under side of member 35 at the center thereof by means of a bolt 47a. One arm of bell crank 43 is pivotally connected to drag link 42. A link 44 is connected to the other arm and extends forwardly, being connected at its forward end to a bracket 45 bolted to the tractor draw bar 46.

Tongue truck 36 supports a stub tongue 47, the latter being connected at its rear end between members 34 and 35 by means of bolt 47a. Its forward end is braced by means of forwardly converging braces 48 connected at their rear to the members 34 and 35. A clevis 49 is supported from the forward end of tongue 47 by means of brackets 50 and brace members 51 connected at their front end to the lower end of clevis 49 and at the rear end to the opposite sides of tongue 47. A connecting member 52 is connected by means of a pin passing through a selected one of the holes 53 in the clevis 49. This member loops through a perforation in bracket 54 bolted to the tractor draw bar 46.

To set either digging unit into operation, the lever 26 of the unit is rotated forwardly. This causes a downward rotational movement of the unit about axle 7 as an axis, and the consequent lowering of the digging tool 11. To raise either digging unit out of operative position, the lever 26 of the unit is rotated rearwardly, which causes upward rotational movement of the unit about axle 7, and the consequent raising of the digging tool. Each unit being independently pivoted on axle 7 and independently supported from the tongue truck 36, each unit can be raised into non-operating position, or lowered into operating position, independently of the other.

The elevators of each digging unit are operated through a power take-off connection from the motor of the tractor. These connections comprise a power take-off shaft 60, a universal joint 61, a telescopic connection 62, a universal joint 63, a shaft 64 and a universal joint 65. Shaft 64 is journaled at its front end in a bearing supported in a bracket 66 fixed to the side of the inside member 22 of digging unit 6. Universal joint 65 is connected to a short drive shaft 67 which is journaled in a bearing 68 supported on the super-structure 69. The super-structure 69 comprises a rectangular framework consisting of members 70, 71, 72, and 73 which is supported above the frame 10 by means of uprights 74 and 75 fixed to the sides of frame structure 10 of digging unit 6.

A jack shaft 76 is journaled in bearings 77 and 78 carried by frame members 72 and 73 respectively. A bevel gear 79 is fixedly mounted on jack shaft 76 and meshes with a bevel gear 80 fixedly mounted on the end of the drive shaft 67. The conveyors of the digging unit 6 are driven through the jack shaft 76 through a driving chain 81 trained over a sprocket 82 fixed on the outer end of jack shaft 76 and a sprocket 83 mounted on the outer end of shaft 18. A driving chain 84 is trained over a sprocket 85 fixedly mounted on the inner end of shaft 18 and is trained over a sprocket 86 fixed to the inner end of shaft 18a.

The conveyors of the digging unit 5 are driven through a driving connection from the jack shaft 76 which connection includes a double sprocket member 87 journaled on the axle 7. The double sprocket member 87 comprises a sprocket 88 and a sprocket 89 integrally connected by means of a hub portion 89a. This double sprocket is driven from the jack shaft 76 through a connection comprising a driving chain 90 trained over a sprocket 91 mounted on the inner end of jack shaft 76 and trained over sprocket 89. Another driving chain 92 is trained over the sprocket 88 and a sprocket 93 mounted on the inner end of shaft 18 of the digging unit 5. The conveyor 12a of digging unit 5 is driven through shaft 18 of this unit by means of a driving chain 94 trained over sprocket 95 on the outer end of shaft 18 and sprocket 96 on the outer end of shaft 18a.

By reason of the driving connection between the two units including the double sprockets 87, either digging unit 5 or 6 may be raised or lowered to any position independently without the driving connection between the two units being operatively affected, for the reason that sprocket 87 is journaled for rotational movement about an axis coincident with the axis of pivotal movement of one digging unit with respect to the other.

Two-row potato diggers, especially those built for territories in which a number of different row spacings may be found, are usually built so that the distance between the two units may be varied to accommodate any given row spacing. In the present machine the distance between the two digging units may be adjusted by moving one or the other unit laterally on the supporting axle 7, shifting the adjacent supporting wheel outwardly on axle 7 a corresponding amount, and also making a corresponding lateral shift of block 33 in members 34 and 35. As shown in Figure 4, the depending brackets 10b are held in position on the axle 7 by means of bolts 101 which pass through elongated slots in flanges 102 and through a transverse boring 103 in the axle. The slots 102 permit pivotal movement of the digging unit with respect to the axle. Extra transverse borings 103a and 103b are provided in axle 7 for receiving bolt 101 when the digger unit is shifted laterally to either of two other positions defined thereby. As previously described, a series of holes 38a and 38b are provided in members 34 and 35 of the tongue truck into registry with either of which the boring in the block 33 may be positioned. Wheels 8 and 9 may be shifted laterally to any position on axle 7 by shifting collars 106 and 107 which are clamped on the axle 7 by means of cap screws 108.

To maintain the driving chains 90 and 92 in alinement with the sprockets over which they are trained, double sprocket 87 may be adjusted laterally on the axle 7 by loosening the collars 104 and 105 and shifting the collars and the double sprocket laterally a distance corresponding to the amount of shift of the digging units on axle 7, and shifting sprocket 91 the same amount laterally on the jack shaft 76.

While I have shown one specific embodiment of my invention, I do not intend it to be limited to the precise construction shown. Many modifications may suggest themselves to those skilled in the art without departing from my invention. For example, the drive between the first and second unit shown as comprising sprocket 91, driving chain 90, double sprocket 87, driving chain 92 and sprocket 93 might take the form of a shaft having a bevel gear on one end meshing with a bevel gear on jack shaft 76 and a bevel gear on the other end meshing with a bevel gear journaled on axle 7, and a second shaft having a bevel gear at one end meshing with the bevel gear journaled on axle 7 and a bevel gear on the other end meshing with a bevel gear on shaft 18.

What I claim and desire to have protected by Letters Patent is:

1. A two-row potato digger comprising a wheel supported axle, a first and a second digging unit mounted on said axle for independent pivotal movement with respect to each other, each unit having an elevator, a jack shaft mounted on the first unit, means for driving said jack shaft, driving connections between said jack shaft and the elevator of said second unit, said latter connections including a double sprocket journaled on said axle, a driving chain connection from said double sprocket to a sprocket on said jack shaft and a driving chain connection from said double sprocket to the elevator of said second unit.

2. A two-row potato digger comprising a wheel supported axle, a first and a second digging unit mounted on said axle for independent pivotal movement with respect to each other, each unit having an elevator, a jack shaft mounted on the first unit, means for driving said jack shaft, driving connections between said jack shaft and the elevator of said first unit, and driving connections between said jack shaft and the elevator of said second unit, said latter connection including a power receiving and power transmitting element journaled on said axle, means for delivering power to said element from said jack shaft, and means for delivering power from said element to the elevator of said second unit.

3. A two-row potato digger comprising a wheel supported axle, a first and a second digging unit mounted on said axle for independent pivotal movement with respect to each other, each unit having an elevator, a jack shaft mounted on the first unit, means for driving said jack shaft, driving connections between said jack shaft and the elevator of said first unit, and driving connections between said jack shaft and the elevator of said second unit, said latter connections including a power receiving and power transmitting element journaled on said digger for rotational movement about an axis coincident with the pivotal axis of said digging units, means for delivering power to said element from said jack shaft, and means for delivering power from said element to said second unit.

4. A multi-row agricultural implement adapted to be drawn by a tractor and having separate operating units for each row one of said units being pivotally mounted for independent pivotal movement with respect to the other unit, driving connections extending from the tractor to one of the units for driving the same, and connections for driving another unit from said one unit, said connections including a power receiving and transmitting element journaled on the implement for rotational movement about an axis coincident with the axis of relative pivotal movement of said units.

In witness whereof I hereunto subscribe my name this 22nd day of March, 1930.

SHELDON S. SPIRE.